United States Patent [19]

Cockshott et al.

[11] 4,104,913

[45] Aug. 8, 1978

[54] APPARATUS FOR MEASURING THE MASS FLOW OF A FLUID

[75] Inventors: Charles Peter Cockshott, Balsall Common; John Howard Moore, Redditch, both of England

[73] Assignee: Lucas Industries Limited, Birmingham, England

[21] Appl. No.: 780,154

[22] Filed: Mar. 22, 1977

[30] Foreign Application Priority Data

Apr. 8, 1976 [GB] United Kingdom ............... 14233/76

[51] Int. Cl.$^2$ ............................................. G01F 1/56
[52] U.S. Cl. ............................................. 73/194 F
[58] Field of Search ..................................... 73/194 F

[56] References Cited

U.S. PATENT DOCUMENTS

| | | | |
|---|---|---|---|
| 3,544,888 | 12/1970 | Sellen, Jr. ............... | 324/33 X |
| 3,986,111 | 10/1976 | Sellers ................... | 73/194 F |
| 4,003,254 | 1/1977 | Bullis et al. ........... | 73/194 F |

Primary Examiner—Charles A. Ruehl
Attorney, Agent, or Firm—Ladas, Parry, Von Gehr, Goldsmith & Deschamps

[57] ABSTRACT

Apparatus for measuring the mass flow of a fluid comprises a first ionizing electrode which, in use, is located in the path of fluid flow and, when energized, ionizes said fluid. A second substantially cylindrical, hollow collector electrode extends around said first electrode so that, in use, the ions produced by the first electrode migrate to the second electrode. The second electrode includes a plurality of conductive rings which are spaced apart in the direction of fluid flow and insulating material is interposed between adjacent rings, but is arranged so as not to be exposed to the ions migrating to the rings in use. Means is responsive to the amount of ion migration to the various conductive rings for measuring the displacement of the ions by the fluid flowing past the electrodes, the displacement being dependent upon the mass flow of the fluid.

5 Claims, 2 Drawing Figures

APPARATUS FOR MEASURING THE MASS FLOW OF A FLUID

This invention relates to apparatus for measuring the mass flow of a fluid.

Apparatus, according to the invention, comprises a first ionizing electrode which, in use, is located in the path of fluid flow and, when energized, ionizes said fluid, a second substantially cylindrical, hollow collector electrode which extends around said first electrode and to which, in use, the ions produced by the first electrode migrate, the second electrode including a plurality of conductive rings spaced apart in the direction of fluid flow with insulating material being interposed between adjacent rings, so as not to be exposed to the ions migrating to the rings in use, and means responsive to the amount of ion migration to the various conductive rings for measuring the displacement of the ions by the fluid flowing past the electrodes, displacement being dependent upon the mass flow of said fluid.

Preferably, said means includes a respective resistive element connected between each pair of adjacent conductive rings and a comparator having inputs connected to the resistive elements respectively associated with the end conductive rings, the comparator being arranged so as to produce an output dependent on the difference between the signals produced at said inputs when said ions migrate to the second electrode, said output thereby being dependent on the ion displacement by said fluid flow.

Conveniently, said comparator includes a differential amplifier.

Conveniently, said comparator in use produces a further output dependent on the sum of the signals at said inputs.

Preferably, the first electrode is movable relative to the second electrode in the direction of the cylindrical axis of the second electrode.

In the accompanying drawings, which illustrate one example of the invention:

Figure 1:
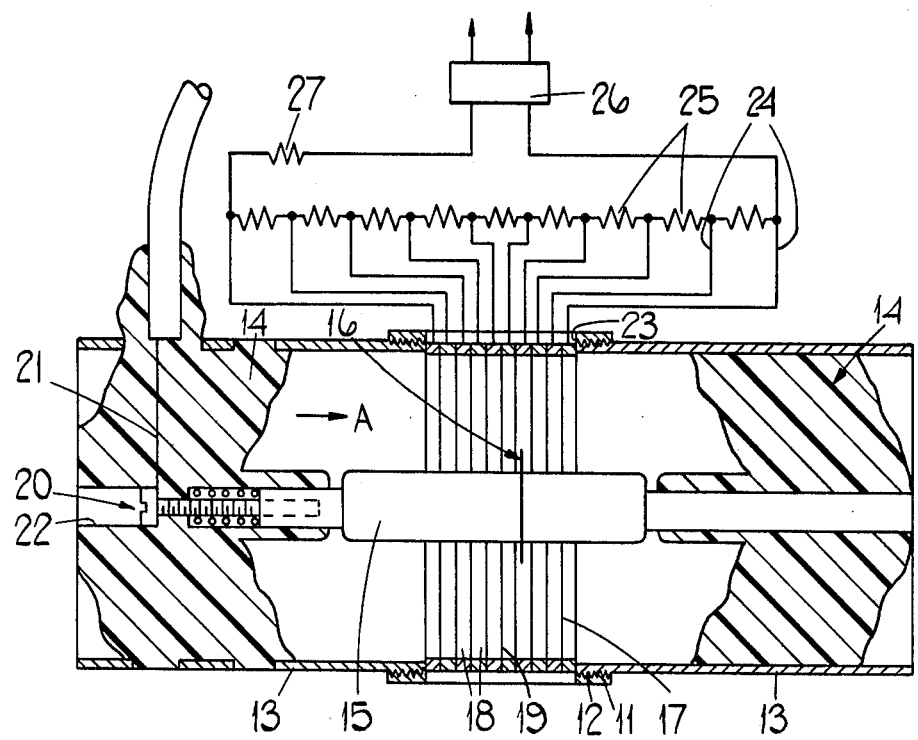
FIG. 1 is a diagrammatic illustration of mass flow measuring apparatus.
Figure 2:
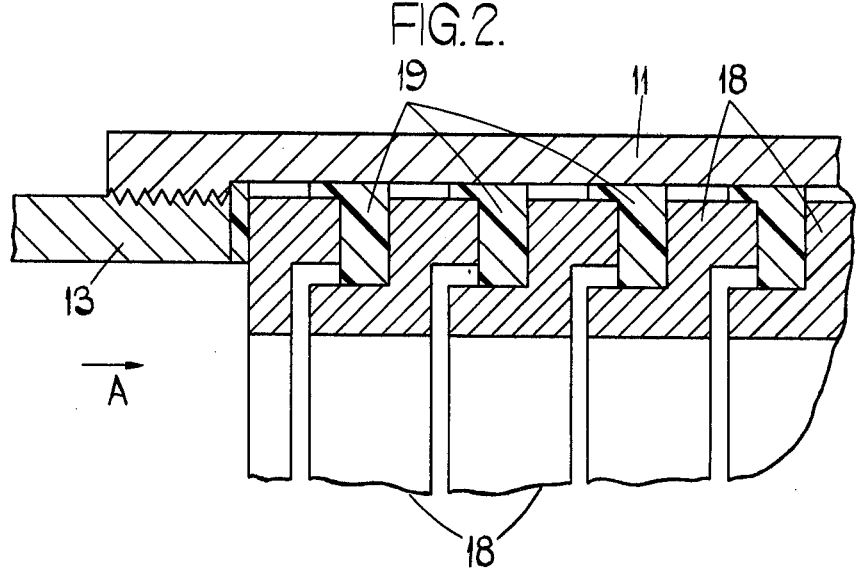
FIG. 2 is a sectional view to an enlarged scale of part of FIG. 1.

Referring to the drawings, the apparatus includes an outer, cylindrical casing 11 which is formed with an internally screw-threaded portion 12 at each of its axial ends. Engaged with the portions 12 are respective, hollow cylindrical carrier members 13 each of which is provided at one end with an external screw-thread complementary with the respective portion 12. The casing 11 and carrier members 13 are each formed of stainless steel and supported by the carrier members 13 are respective insulating plugs 14 conveniently formed from a high voltage capability epoxy resin or from a glazed ceramic. Axially extending passages (not shown) are defined in each plug 14 so that, in use, fluid whose flow rate is to be determined can flow by way of the passages through the carrier 13 and casing 11.

Mounted between the plugs 14 is an elongated, stainless steel support 15 which extends axially through the casing 11 and to which is secured a disc 16, also formed of a stainless steel. The disc 16 defines a first, ionizing electrode and is positioned so that its major surfaces extend perpendicular to the axis of the casing 11. Surrounding the electrode 16 is a second, hollow cylindrical collector electrode 17 defined by a plurality of axially spaced stainless steel rings 18 which are insulated from each other, the casing 11 and the members 13 by insulating rings 19 cut and shaped from a polypropylene sheet 0.050 in. thick. In use, the electrode 16 is maintained at a high positive potential (8–18kV) relative to the electrode 17 so that, when fluid flows through the casing 11 between the electrodes 16, 17 the fluid is ionized by the electrode 16 and the ions produced migrate to the electrode 17. The ions are then collected by the rings 18, the amount of ion migration to the various rings providing a measurement of the mass flow of fluid between the electrodes 16, 17. It is, however, important that the insulating rings 19 are not exposed to the ions which in use migrate to the conductive rings 18 from the electrode 16, since otherwise it is found that in use the insulating material becomes charged and interferes with the correct operation of the apparatus. An additional advantage is that the insulators are protected from dirt. In the example shown the required arrangement of the insulating material is achieved by trapping the rings 19 between overlapping peripheral portions of the rings 18.

In use, the electrode 16 is connected to a high voltage positive supply (not shown) by way of the support 15, a screw 20 engaged with the support 15 and a conductor 21 carried by and extending through one of the plugs 14. The head of the screw 20 is exposed through a bore 22 in said one plug 14 and the arrangement is such that rotation of the screw 20 moves the support 15 and electrode 16 axially relative to the second electrode 17. Formed in the casing 11 is an axially extending slot 23 through which extends electrical leads 24 connected to the rings 18 respectively. The leads 24 connect between adjacent pairs of rings 18 respective resistive elements 25, the elements associated with the rings 18 defined at the ends of the electrode 17 being connected to the inputs respectively of a comparator 26. The comparator 26 is in the form of a sum-and-difference amplifier and hence produces a first output dependent upon the difference between the input signals to the comparator and a second input dependent upon the sum of said input signals.

In use, when the electrode 16 is energized to ionize fluid between the electrodes 16, 17 then the input signals to the comparator 26 will be equal if the electrode 16 is positioned half way between the ends of the electrode 17 and the fluid flow rate through the casing 11 is zero. In this situation, of course, the comparator 26 does not produce said first output signal. If, however, the fluid is caused to flow in the direction of arrow A in the drawings then more ions will migrate towards the rings 18 located downstream of the electrode 16, than towards the rings located upstream of the electrode 16. The inputs to the comparator 26 will therefore now become different so that the comparator will produce said first output signal, the value of which gives a measure of the displacement of the ions by the fluid flowing past the electrodes 16, 17 and is dependent upon the mass flow of the fluid. Similarly, the second output signal from the comparator will vary as the fluid flow rate varies so that the signals can be used to give a measure of the mass flow of the fluid.

The apparatus shown in the drawings is intended to measure fluid flow in either direction, but the maximum flow to be measured in greater in the direction shown by arrow A than in the opposite direction. Electrode 16 is therefore displaced from the centre of the electrode system. In this arrangement, an additional resistor 27 must be added to the resistor chain 25 of such a value as to make the output zero for zero air flow. This resistor may be made variable to provide a manual zero adjustment for the device.

In one practical embodiment, the apparatus described above was used to measure air mass flow in the inlet manifold of an internal combustion engine and includes twelve rings 18 each having an internal diameter of 2.052 inches, and a thickness of 0.176 inch and a width of 0.092 inch. Moreover, the electrode 16 conveniently has a diameter of 0.75 inch, while the overall length of the hollow body defined by the casing 11 and carrier members 13 is conveniently 5.44 inches.

We claim:

1. Apparatus for measuring the mass flow of a fluid, comprising a first ionizing electrode which, in use, is located in the path of fluid flow and, when energized, ionizes said fluid, a second substantially cylindrical, hollow collector electrode which extends around said first electrode and to which, in use, the ions produced by the first electrode migrate, the second electrode including a plurality of conductive rings spaced apart in the direction of fluid flow with insulating material being interposed between adjacent rings and at least one ring of each pair of adjacent conductive rings overlapping the insulating material between the rings so as to prevent said insulating material being exposed to the ions migrating to the rings in use, and means responsive to the amount of ion migration to the various conductive rings for measuring the displacement of the ions by the fluid flowing past the electrodes, displacement being dependent upon the mass flow of said fluid.

2. Apparatus as claimed in claim 1, wherein said means includes a respective resistive element connected between each pair of adjacent conductive rings and a comparator having inputs connected to the resistive elements respectively associated with the end conductive rings, the comparator being arranged so as to produce an output dependent on the difference between the signals produced at said inputs when said ions migrate to the second electrode, said output thereby being dependent on the ion displacement by said fluid flow.

3. Apparatus as claimed in claim 2, wherein said comparator includes a differential amplifier.

4. Apparatus as claimed in claim 2, wherein said comparator in use produces a further output dependent on the sum of the signals at said inputs.

5. Apparatus as claimed in claim 1, comprising means supporting the first electrode relative to the second electrode so that the support means, and the first electrode supported thereby, are movable relative to the second electrode in the direction of the cylindrical axis of the second electrode.

* * * * *